US006895113B2

(12) United States Patent
Baker et al.

(10) Patent No.: US 6,895,113 B2
(45) Date of Patent: May 17, 2005

(54) METHOD AND APPARATUS FOR DISTRIBUTING COLOR CORRECTED IMAGES ACROSS A NETWORK USING DISTRIBUTED CACHING

(75) Inventors: Tamara Baker, San Jose, CA (US); William J. Hilliard, San Francisco, CA (US)

(73) Assignee: LightSurf, Inc., Santa Cruz, CA (US)

( * ) Notice: Subject to any disclaimer, the term of this patent is extended or adjusted under 35 U.S.C. 154(b) by 780 days.

(21) Appl. No.: 09/827,018

(22) Filed: Apr. 5, 2001

(65) Prior Publication Data

US 2001/0039567 A1 Nov. 8, 2001

Related U.S. Application Data

(60) Provisional application No. 60/195,658, filed on Apr. 7, 2000.

(51) Int. Cl.[7] .................................................. G06K 9/00
(52) U.S. Cl. ........................ 382/167; 382/164; 382/167; 703/203; 345/589; 345/600; 345/604; 348/179
(58) Field of Search .......................... 709/203; 382/162, 382/165, 167, 164; 358/500, 518; 345/589, 600, 604; 348/179

(56) References Cited

U.S. PATENT DOCUMENTS

| | | | | |
|---|---|---|---|---|
| 5,381,349 A | * | 1/1995 | Winter et al. ................ | 382/167 |
| 5,483,259 A | * | 1/1996 | Sachs ........................ | 345/600 |
| 5,606,365 A | | 2/1997 | Maurinus et al. | |
| 5,638,117 A | * | 6/1997 | Engeldrum et al. ......... | 348/179 |
| 5,666,215 A | | 9/1997 | Fredlund et al. | |
| 5,739,809 A | | 4/1998 | McLaughlin et al. | |
| 5,774,230 A | | 6/1998 | Goto | |
| 5,793,414 A | | 8/1998 | Schaffer | |
| 5,818,525 A | | 10/1998 | Elabad | |
| 5,850,484 A | | 12/1998 | Beretta et al. | |

(Continued)

FOREIGN PATENT DOCUMENTS

| | | |
|---|---|---|
| EP | 0 849 936 A2 | 6/1998 |
| EP | 878303 A2 * 11/1998 | ........... B41F/33/00 |
| EP | 0 878 303 A2 | 1/1999 |
| EP | 0 907 283 A1 | 7/1999 |
| EP | 0 889 636 A2 | 11/1999 |
| EP | 1103918 A2 | 5/2001 |
| JP | 10-224643 | 8/1999 |
| WO | WO 98/37690 | 8/1998 |
| WO | WO 98/15091 | 9/1998 |
| WO | WO 00/08889 | 2/2000 |
| WO | WO 00/23944 | 4/2000 |
| WO | WO 00/29935 | 5/2000 |

OTHER PUBLICATIONS

McClelland, Deke "Innovative image editors" Feb. 1995, Macworld, vol 12, issue 2, p. 112 8 pp.*

(Continued)

*Primary Examiner*—Anthony Knight
*Assistant Examiner*—Thomas Pham
(74) *Attorney, Agent, or Firm*—Blakely, Sokoloff, Taylor & Zafman LLP

(57) ABSTRACT

Color corrected images are stored at one or more caching servers on a computer network. A client computer requests a color corrected image from a caching server, which attempts to select an image in response to the image request. If no images are available at the caching server to fulfill the image request, the image request is forwarded to a color server where an image is selected and, optionally, corrected in response to the image request. The color corrected selected image is returned to the caching server to be stored and to further be provided to the client computer. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

27 Claims, 1 Drawing Sheet

U.S. PATENT DOCUMENTS

| | | | |
|---|---|---|---|
| 5,874,988 A | | 2/1999 | Gu |
| 5,913,222 A | * | 6/1999 | Liedtke .......................... 711/3 |
| 6,008,836 A | | 12/1999 | Bruck et al. |
| 6,009,192 A | | 12/1999 | Klassen et al. |
| 6,009,503 A | * | 12/1999 | Liedtke ...................... 711/203 |
| 6,036,317 A | | 3/2000 | Seegers et al. |
| 6,064,437 A | | 5/2000 | Phan et al. |
| 6,075,514 A | * | 6/2000 | Ryan .......................... 345/601 |
| 6,081,254 A | | 6/2000 | Tanaka et al. |
| 6,088,475 A | | 7/2000 | Nagashima et al. |
| 6,091,518 A | * | 7/2000 | Anabuki ..................... 358/500 |
| 6,097,838 A | | 8/2000 | Klassen et al. |
| 6,097,853 A | | 8/2000 | Gu et al. |
| 6,154,600 A | | 11/2000 | Newman et al. |
| 6,157,735 A | | 12/2000 | Holub |
| 6,167,382 A | | 12/2000 | Sparks et al. |
| 6,182,073 B1 | | 1/2001 | Kukkal |
| 6,198,842 B1 | | 3/2001 | Yeo et al. |
| 6,243,420 B1 | | 6/2001 | Mitchell et al. |
| 6,243,761 B1 | | 6/2001 | Mogul et al. |
| 6,268,939 B1 | | 7/2001 | Klassen et al. |
| 6,309,117 B1 | | 10/2001 | Bunce et al. |
| 6,337,922 B2 | * | 1/2002 | Kumada ..................... 382/162 |
| 6,439,722 B1 | | 8/2002 | Seegers et al. |
| 6,525,721 B1 | | 2/2003 | Thomas et al. |
| 6,581,109 B1 | | 6/2003 | Fields et al. |
| 6,693,647 B1 | | 2/2004 | Bernard et al. |
| 6,744,448 B1 | | 6/2004 | Bernard et al. |
| 2003/0091229 A1 | | 5/2003 | Edge et al. |

OTHER PUBLICATIONS

"Circuits: Getting Colors Right With New Technology", *The New York Times*, Thursday, Feb. 10, 2000.

SGI Cosmo Color Web Color Management brochure, 1996, 2 pages.

WebSync brochure, 1999.

Pantone Personal Color Calibrator brochure, 1999.

"Reducing WWW Latency and Bandwith Requirements by Real-Time Distillation", Computer Networks and ISDN Systems, vol. 28, No. 11, May 1, 1996, pp. 1445-1456.

"Encrypted Username/Password Support," Netscape Internet Site—Consumer Articles, Aug. 12, 1998, 1 page.

"Padlock Security Indicator Does Not Work Correctly With Frames," Netscape Internet Site—Consumer Articles, Aug. 12, 1998, 1 page.

Patent Abstracts of Japan—Publication No. 10117290.

* cited by examiner

METHOD AND APPARATUS FOR DISTRIBUTING COLOR CORRECTED IMAGES ACROSS A NETWORK USING DISTRIBUTED CACHING

RELATED APPLICATIONS

This application claims the priority of provisional application Ser. No. 60/195,658, filed Apr. 7, 2000.

BACKGROUND OF THE INVENTION

1. Field of the Invention

This invention relates to image delivery over a network and more specifically to delivering color corrected images using distributed caching.

2. Description of the Prior Art

Color correcting images for delivery to users through a network generally relies on knowledge of each user's system. Thus color corrected images are usually prepared individually for each user according to the characterization of the user's system, and are not generally cacheable. Some systems create multiple versions of images for delivery over a network. What is needed is a technique of correcting and delivering images over a network that is compatible with distributed caching and would permit users having similarly characterized systems to receive similar images from distributed caching and thus optimize image delivery.

SUMMARY OF THE INVENTION

The invention provides a method for distributing images and other content over a network whereby multiple versions of an image, color corrected for individual classes of users, are integrated with a content distribution network so that these multiple image versions are dispersed geographically over different caching servers connected to the network. Color corrected images may be combined with regional caching solutions to speed the delivery of the images to the end user. Regional caching solutions use the URL of the image to tag it as cache-able and optionally can provide information to the caching service to improve the efficiency of caching. In a first aspect, the present invention uses information in the URL to color correct an image. By combining the information needed for caching with the information needed for color correction, the present invention can work in conjunction with distributed caching systems to provide regionally cached, color corrected images.

In another aspect, the present invention provides a system that can be delivered with many caching servers distributed worldwide and one central color correction server or it can be delivered with multiple color correcting and caching servers distributed worldwide. In both cases color corrected images can be delivered to the end user faster than a solution that does not combine color correction and distributed caching, or color correcting alone.

Thus, in one aspect, the present invention provides a method for distributing color corrected images over a computer network to a client computer by receiving an image request from the client computer, selecting a color corrected image from a cache of color corrected images in response to the request wherein each image in the cache is corrected according to one of a finite number of sets of image display characteristics, and forwarding the image request to a color server to select an image in response to the request when an image cannot be selected from the cache in response to the request. Further, an image provided by the color server in reply to the request may be stored in the cache of color corrected images for later use as well as forwarded to the client computer.

In another aspect of the invention, a computer network for distributing color corrected images to a client computer comprises a cache of color corrected images, each image corrected according to one of a finite number of sets of image display characteristics; a caching server to receive an image request from the client computer and connected to the cache to select a color corrected image from the cache in response to the request; and a color server connected to the caching server to receive the image request and to select an image in response to the request when the caching server cannot select an image from the cache in response to the request.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE INVENTION

Figure 1:
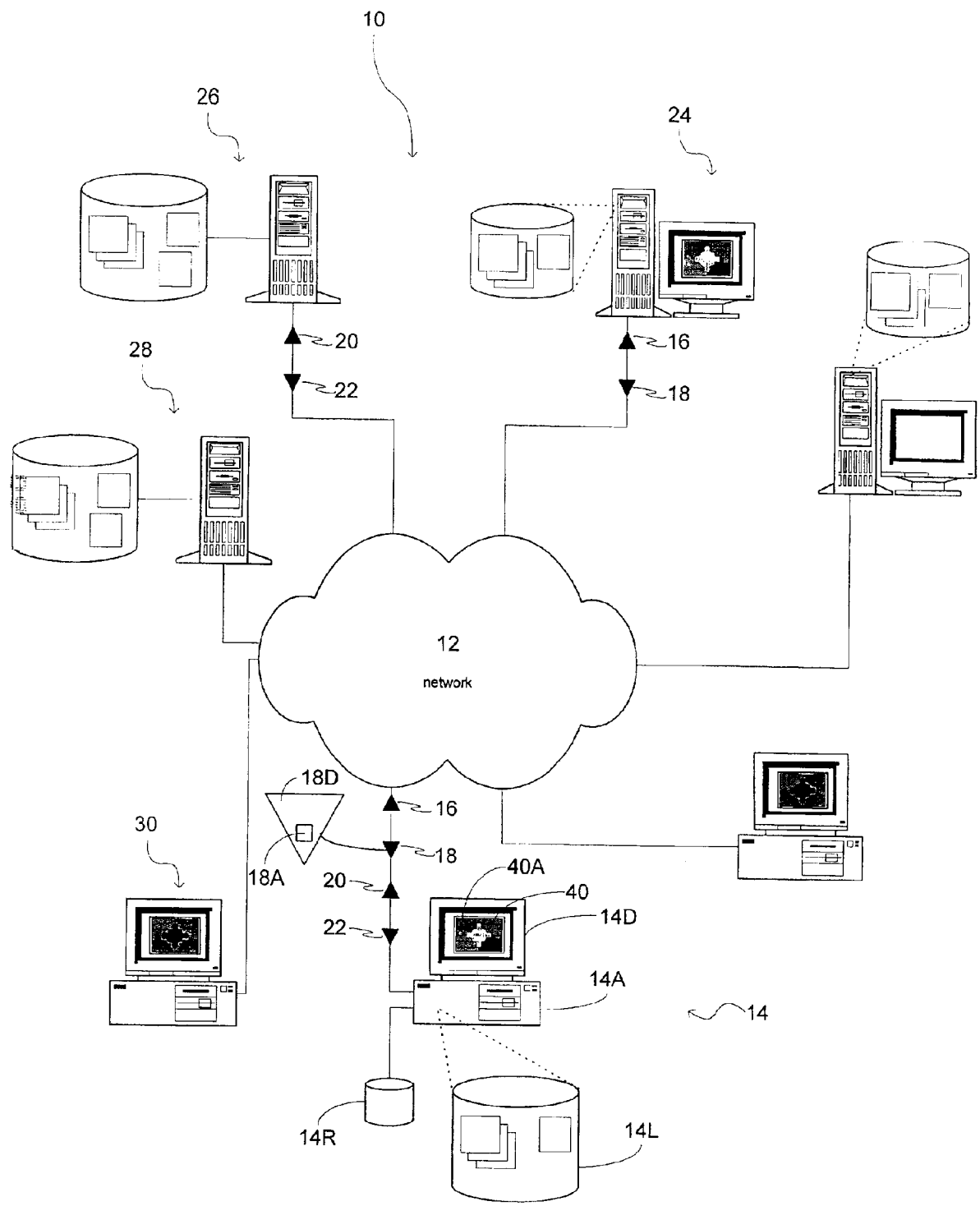
FIG. 1 is a block diagram of a computer network according to the present invention.

Referring now to FIG. 1, system 10 according to the present invention provides color images from network servers to users, enhanced when possible, with user specific color correction information to provide high fidelity color images to the users. In particular, in accordance with a preferred embodiment of the present invention, color server 28 may provide color catalog pages for clothing or other products to a potential buyer, such as user 14, adjusted to provide high fidelity color images in accordance with the color display characteristics of display 14D.

In general, system 10 may include one or more network servers and one or more users. Network servers may include color server 28, commercial server 24, and caching server 26. Users may include users 14 and 30, interconnected to network servers using network 12. Network nodes such as color server 28 may serve as a user or client for some purposes and a server for others. System 10 does not require a static server, constantly functioning as a server, in all embodiments.

Network 12 may be any type of network such as a LAN, intranet or an internet such as the World Wide Web (WWW). Network 12 may also utilize any type of appropriate network protocol, such as HTTP as used on the World Wide Web. Color server 28 may be used to host color correctable images 50 to be made available to users of commercial or other network sites. Caching server 26 may also be used to host color corrected images according to the present invention.

User 14 may be any conventional network client device and may include one or more electronic devices 14A, conventionally a personal computer or workstation, and one or more display devices 14D, conventionally a CRT or LCD display monitor. User 14 may also include remote storage 14R and or local storage 14L within electronic device 14A. Remote storage 14R may also be available to electronic device 14A through network 12. User 14 may also include one or more output devices, which may be any type of printer, recorder or plotter. User 14 may also include one or more input devices, which may be any type of scanner, reader, image capture device or other data transfer device.

Delivery of color corrected data 40 according to the present invention begins with request 16 sent to commercial server 24 for the display of an image on monitor 14D. Request 16 may originate with user 14 or any other network device such as commercial server 24. Image request 16 may be an individual request for a specific image, graphic, drawing, rendering or similar data file or it may be part of a larger data request such as a web page request. According to the present invention, commercial server 24 may respond to image request 16 by transferring non-color data 18 to user 14. Non-color data 18 further includes one or more addresses 18A for color corrected images such as image 40A to be combined with data 18D to satisfy request 16.

If display calibration or characterization data 42 is available to commercial server 24 or to color server 28, a color corrected version of image 40A may be provided to user 14 in accordance with data 42. Thus, image 40A as then displayed on display 14D may be a more accurate color representation of a reference or author image, image 44, than may otherwise be achieved. Concurrent with delivery of color corrected images, display 14D may present a visual or other indicator 46, indicating that the image or images being viewed are color corrected and accurate. Indicator 46, or a variation thereof, may also be used to indicate when images are not color corrected and/or provide other information to user 14. An online shopper or other user may have increased confidence to make purchases, as a result of viewing image 40A over network 12, knowing the color of image 40A as actually viewed is accurate.

By converting calibration or characterization data 42 into a request such as image request 20, caching server 26 may receive enough information to provide 14 with a color corrected image. Network users such as user 14 may be grouped to permit multiple users to retrieve cached images from caching servers such as caching server 26. The users may be grouped into subsets according to their image display characteristics so that correction of images is limited to a finite number of perceptually uniform subsets. Each subset is selected so that a single image provided to all users within the subset is perceptually identical (or nearly identical) to all users within the subset. Thus, caching server 26 may store a finite number of pre-corrected images among which to select an image in response to an image request from a user 14 based upon the subset to which the user has been assigned, as dictated by the user's image display characteristics.

By incorporating information on a users characterization data and/or color correction group, cached images may be delivered. The incorporated information may be formatted to resemble an object to conform to network addressing requirements such as WWW URL's. One embodiment of URL addressing according to the distributed content caching method of the invention is as follows. The first step is to combine the distributed caching information and the color correction information into a single image request, using URLs to encode the two types of information.

An image URL:

http://www.MyWebSite.com/public/mandrill.jpg

The image URL with color correction information encoded:

http://MyWebSite.imager.trueinternetcolor.com/ImageServer/ViewingProfile_100_125_130_200/Image_http_www.MyWebSite.com/public/mandrill.jpg where http://MyWebSite.imager.trueinternetcolor.com/ImageServer is the location of the color correction server /ViewingProfile_100_125_130_200 is the color correction information /Image_http_www.MyWebSite.com/public/mandrill.jpg is the image to be color corrected The image URL encoded for distributed caching:

http://a500.g.akamai.net/7/500/404/106b0276/www.MyWebSite.com/public/mandrill.jpg where http://a500.g.akamai.net is the location of the caching server /7/500/404/106b0276/ is caching specific information www.MyWebSite.com/public/mandrill.jpg is the image to be delivered from cache The image URL encoded for both color correction and distributed caching:

http://a500.g.akamai.net/7/500/404/106b0276/MyWebSite.imager.trueinternetcolor.com/ImageServer/ViewingProfile_100_125_130_200/Image_http_www.MyWebSite.com/public/mandrill.jpg where http://a500.g.akamai.net is the location of the caching server /7/500/404/106b0276 is caching specific information /MyWebSite.imager.trueinternetcolor.com/ImageServer is the location of the color correction server /ViewingProfile_100_125_130_200 is the color correction information /Image_http_www.MyWebSite.com/public/mandrill.jpg is the image to be color corrected and delivered from cache Another embodiment of URL addressing may be as follows.

The image URL with color correction information encoded:

http://MyWebSite.imager.trueinternetcolor.com/ImageServer/Protocol_3dCSP_2c100_26Method_3dGetCorrectedImage_26Customer_3d2000_26ViewingProfile_3d100_5f0_5f0.000_5f0.000_5f0.000_5f0_26Image_3dhttp_3a_2f_2fwww.MyWebSite.com_2fpublic_2fmandrill.jpg The image URL encoded for distributed caching:

http://MyWebSite.geo.trueinternetcolor.com/public/mandrill.jpg

The image URL encoded for both color correction and distributed caching:

http://MyWebSite.geo.trueinternetcolor.com/ImageServer/Protocol_3dCSP_2c100_26Method_3dGetCorrectedImage_26Customer_3d135724_26ViewingProfile_3d100_5f0_5f0.000_5f0.000_5f0.000_5f0_26Image_3dhttp_3a_2f_2fwww.MyWebSite.com_2fpublic_2fmandrill.jpg In both of the above embodiments the request 20 for the color corrected image is handled first by the distributed caching system, which attempts to fulfill the request if it is stored in the local cache. If the image is not stored in the local cache, the caching server 26 passes the request to the color correction server 28. The color correction server performs the color correction on the image and returns it to the caching server. The caching server fulfills the initial image request and then stores the color corrected image in its cache for future requests.

The method of the invention may employ more than one content distribution network for geographic caching, and may further select the appropriate network based on performance, bandwidth pricing, network load, or other relevant characteristics. The method of the invention is not limited to images intended to be viewed on the internet, but could equally apply to images for print on a network-connected print device or other output device. The method of the invention may also be used in geographic caching systems for distributing multiple copies of audio, multimedia, taste, touch, or olfactory files—each adjusted for sensory correctness and distributed via a geographic caching service. The invention could also apply to files adjusted by image resolution or other non-color image characteristics, with these plurality of files geographically cached using a content distribution network, or a plurality of content distribution networks.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A computer network for distributing color corrected images to a client computer, comprising:
    a cache of color corrected images, each image corrected according to one of a finite number of sets of image display characteristics;
    a caching server to receive an image request from the client computer and connected to the cache to select a color corrected image from the cache in response to the request; and
    a color server connected to the caching server to receive the image request and to select an image in response to the request when the caching server cannot select an image from the cache in response to the request.

2. The network of claim 1, wherein the color server further comprises:
    a color server to color correct the selected image.

3. The network of claim 1, wherein the color server further comprises:
    a color server to color correct the selected image in response to the image request.

4. The network of claim 1, wherein:
    the computer network is an internet; and
    the image request comprises a URL address of the requested image.

5. The network of claim 1, wherein the color server comprises:
    a color server to receive the image request from the caching server when the caching server cannot select an image from the cache in response to the request.

6. The network of claim 1, further comprising:
    a plurality of caching servers connected to the color server.

7. The network of claim 4, wherein:
    the URL address includes the address of the caching server.

8. The network of claim 4, wherein:
    the image request includes color correction information related to image display characteristics of the client.

9. The network of claim 5, wherein the color server comprises:
    a color server to color correct the selected image in response to the image request.

10. The network of claim 6, further comprising:
    at least one cache of color corrected images connected to each of the plurality of caching servers.

11. The network of claim 7, wherein:
    the URL address includes the address of the color server.

12. The network of claim 9, wherein the color server comprises:
    a color server to provide the color corrected selected image to the caching server.

13. The network of claim 10, further comprising:
    a plurality of color servers, each of the plurality of color servers connected to at least one of the plurality of caching servers.

14. The network of claim 12, wherein the caching server comprises:
    a caching server to provide the color corrected selected image to the client and to the cache.

15. The network of claim 14, wherein the cache comprises:
    a cache to store the color corrected selected image received from the caching server in association with one of the finite number of sets of image display characteristics.

16. A method for distributing color corrected images over a computer network to a client computer, comprising:
    receiving an image request from the client computer;
    selecting a color corrected image from a cache of color corrected images in response to the request, each image in the cache corrected according to one of a finite number of sets of image display characteristics; and
    forwarding the image request to a color server to select an image in response to the request when an image cannot be selected from the cache in response to the request.

17. The method of claim 16, further comprising:
    receiving the image request at the color server to select an image in response to the request when an image cannot be selected from the cache in response to the request.

18. The method of claim 16, wherein receiving the image request further comprises:
    receiving the image request over an internet.

19. The method of claim 17, further comprising:
    selecting an image at the color server in response to the request when an image cannot be selected from the cache in response to the request.

20. The method of claim 18, wherein receiving the image request further comprises:
    receiving an image request comprising a URL address of the requested image.

21. The method of claim 19, further comprising:
    color correcting the selected image at the color server in response to the request.

22. The method of claim 20, wherein receiving the image request further comprises:
    receiving an image request comprising the address of a caching server connected to the cache.

23. The method of claim 21, further comprising:
    forwarding the color corrected selected image from the color server to the cache.

24. The method of claim 22, wherein receiving the image request further comprises:

receiving an image request comprising the address of the color server.

25. The method of claim 23, further comprising:

forwarding the color corrected selected image from the cache to the client.

26. The method of claim 24, wherein receiving the image request further comprises:

receiving an image request comprising color correction information related to image display characteristics of the client.

27. The method of claim 25, further comprising:

storing the color corrected selected image in the cache in association with one of the finite number of sets of image display characteristics.

* * * * *